United States Patent [19]

Gamarra et al.

[11] Patent Number: 4,716,183

[45] Date of Patent: Dec. 29, 1987

[54] STYRENE-DIENE BLOCK COPOLYMER COMPOSITIONS

[75] Inventors: Jose P. Gamarra, Union City; C. John Swinmurn, Los Altos, both of Calif.

[73] Assignee: Raychem Corp., Menlo Park, Calif.

[21] Appl. No.: 801,018

[22] Filed: Nov. 22, 1985

[51] Int. Cl.⁴ ................................................ C08K 5/01
[52] U.S. Cl. ...................................... 522/80; 524/490; 524/491; 524/505
[58] Field of Search ............... 524/484, 485, 486, 490, 524/491; 525/314, 332.9; 522/80

[56] References Cited

U.S. PATENT DOCUMENTS

| | | | |
|---|---|---|---|
| 3,485,787 | 12/1969 | Haefele . | |
| 3,630,905 | 12/1971 | Sorgo | 525/332.9 |
| 3,676,387 | 7/1972 | Lindlof . | |
| 3,827,999 | 8/1974 | Crossland . | |
| 4,001,167 | 1/1977 | Tungseth | 524/484 |
| 4,151,057 | 4/1979 | St. Clair et al. . | |
| 4,176,240 | 11/1979 | Sabia . | |
| 4,369,284 | 1/1983 | Chen . | |
| 4,408,006 | 10/1983 | Milkovich | 525/314 |
| 4,409,357 | 10/1983 | Milkovich | 525/314 |
| 4,432,848 | 2/1984 | Korpman | 522/80 |
| 4,556,464 | 12/1985 | St. Clair | 522/80 |

OTHER PUBLICATIONS

St. Clair, "Radiation Curing of PSA's Based on Thermoplastic Rubbers", *Adhesive Age*, Mar. 1980, pp. 30–36.

*Primary Examiner*—Paul R. Michl
*Attorney, Agent, or Firm*—T. Gene Dillahunty

[57] ABSTRACT

This invention comprises to styrene-diene block copolymer-oil-coupling agent compositions which are radiation cross-linked. In another aspect this invention relates to similar composition wherein the styrene-diene block copolymer is a blend of two different poly(styrene-ethylenebutylene-styrene) triblock copolymers, which composition may also be radiation cross-linked.

10 Claims, No Drawings

STYRENE-DIENE BLOCK COPOLYMER COMPOSITIONS

FIELD OF THE INVENTION

This invention comprises styrene-diene block copolymer-oil compositions which are formed and then radiation cross-linked. In another aspect this invention relates to similar composition wherein the styrene-diene block copolymer is a blend of a poly(styrene-ethylene-butylene-styrene) triblock copolymer, which composition may also be radiation cross-linked.

BACKGROUND OF THE INVENTION

Elastomeric compositions comprising block copolymers and hydrocarbon oils wherein the copolymer constitutes up to about 30% of the composition with the hydrocarbon oil constituting from about 70% to about 98% by weight of the composition are known in the art as well as methods of preparing these compositions. Examples of such compositions and their preparation are illustrated in U.S. Pat. Nos. 3,676,387 to Lindlof; 3,827,999 to Crossland; 4,176,240 to Sabia; and 4,369,284 to Chen. Various compositions within this class of elastomers have different combinations of physical properties such as hardness, ultimate elongation, temperature stability, mechanical strength, surface tackiness, memory or shape recovery properties, and others. The particular combination of properties which any particular elastomer in this class of compositions will have is not predictable from the starting materials and preparation conditions with a very high degree of certainty. Slight changes in ratios of materials, types of materials used and other factors can produce drastic changes in properties of the final composition.

Radiation cross-linking has been used to modify the physical and adhesive properties of certain copolymer-oil adhesive compositions containing from 50 to 100% copolymer and 0 to 50% extender oil. Examples of such adhesive compositions are shown in U.S. Pat. No. 3,845,787 to Haefele et al and the modification of the properties of such adhesives by radiation curing and cross-linking is illustrated in U.S. Pat. No. 4,151,057 to St. Clair et al and in "Radiation Curing of PSA's Based on Thermoplastic Rubbers" by D. J. St. Clair, *Adhesives Age*, Mar. 1980, pages 30–36.

The disclosures of the above patents and literature reference are incorporated herein by reference.

SUMMARY OF THE INVENTION

In one aspect this invention provides a composition comprising:
about 2 to about 30 parts by weight of a mixture of poly(styrene-ethylene-butylene-styrene) triblock copolymers; and
about 70 to about 98 parts by weight of a hydrocarbon oil; and
wherein the mixture of triblock copolymers comprises:
(a) a triblock copolymer having a styrene to ethylene-butylene ratio of 14 to 30 styrene blocks to 70 to 86 ethylene-butylene blocks; and
(b) a triblock copolymer having a styrene to ethylene-butylene ratio of 31 to 35 styrene blocks to 65 to 69 ethylene-butylene blocks; and
wherein the ratio of copolymer (a) to copolymer (b) is from about 15:85 to about 85:15.

In another aspect this invention provides a composition comprising:
about 2 to about 30 parts by weight of a styrene-diene block copolymer;
about 70 to about 98 parts by weight hydrocarbon oil; and
about 0.5 to about 25% by weight based on the weight of the copolymer and oil of a multifunctional coupling agent; and
wherein the copolymer-oil-coupling agent composition is cross-linked with electron beam radiation or with UV radiation in the presence of a photoinitiator.

In another aspect this invention provides a method of preparing an elastomeric composition comprising:
mixing about 2 to about 30 parts by weight of a styrene-diene block copolymer, about 70 to about 98 parts by weight hydrocarbon oil and about 0.5 to about 25% by weight of a multifunctional coupling agent based on the combined weight of the copolymer and oil under shear and elevated temperature which are sufficient to cause the block copolymer to melt and disperse in the hydrocarbon oil; and
cross-linking the resultant composition with electron beam radiation or with UV radiation in the presence of a photoinitiator.

It has surprisingly been found that radiation cross-linking of styrene-diene block copolymer-oil compositions having at least 70% oil gives the composition better shape retention at high temperatures without significantly changing the other physical properties of the composition, such as cone penetration and elongation.

DESCRIPTION OF THE INVENTION

The triblock copolymers useful in the present invention are well known in the art as poly(styrene-ethylene-butylene-styrene) triblock copolymers and are generally referred to as SEBS triblock copolymers. These copolymers have styrene end blocks and ethylene and butylene center blocks and are characterized by the ratio of styrene blocks to the combined ethylene-butylene blocks.

It has been found that a blend of two different SEBS triblock copolymers provides oil extended elastomers according to this invention having certain desired cone penetration, elongation and tensile strength properties. The mixture or blend of SEBS triblock copolymers comprise (a) a harder or stiffer triblock copolymer having a styrene to ethylene-butylene ratio of 14 to 30 styrene blocks to 70 to 86 ethylene-butylene blocks and (b) a softer, more flexible triblock copolymer having a styrene to ethylene-butylene ratio of 31 to 35 styrene blocks to 65 to 69 ethylene-butylene blocks. Preferably copolymer (a) will have a ratio of 20 to 29 styrene blocks to 71 to 80 ethylene-butylene blocks and copolymer (b) will have a ratio of 32 to 34 styrene blocks to 66 to 68 ethylene-butylene blocks and most preferably (a) will have a ratio of 28:72 and (b) will have a ratio of 33:67. The ratio of copolymer (a) to copolymer (b) can be from about 15:85 to about 85:15 and preferably can be from about 25:75 to about 75:25 and more preferably can be from about 40:60 to about 60:40.

The oils useful in the composition comprising the mixture of SEBS triblock copolymers may be any of the oils conventionally used to form elastomeric materials using about 70 to about 98 parts by weight of oil and about 2 to about 30 parts by weight copolymer. The oil may be a hydrocarbon oil such as paraffinic or naphthenic oils, synthetic oils such as polybutene or polypropene oils, and mixtures thereof. The preferred oils are mixtures of non-aromatic paraffins and naphthenic hydrocarbon oils. The oils should have a minimum boiling point higher than the softening point of the triblock copolymers. The ratio of triblock copolymer mixture to the oil will generally range from about 2 to 30 parts copolymer mixtures to 70 to 98 parts oil. In general, it is preferred to use about 5 to 25 parts triblock copolymer and most preferred for many applications to use from about 12 to about 22 parts triblock copolymer.

The SEBS triblock copolymer-oil compositions of this invention can be prepared by conventional melt blending the triblock copolymers with the oil. In order to achieve adequate mixing and for the triblock copolymers to fully melt and disperse in the oil, sufficiently high temperatures and sufficient mixing shear need to be used. The mixing at the elevated temperature should be continued until the mixture is uniform and all of the triblock copolymers is evenly dispersed or blended in the oil. After sufficient mixing, the composition is then poured into the desired molds or shapes and allowed to cool. The resulting elastomeric composition can be re-melted and again cooled without any significant change in physical properties.

The triblock copolymer-oil compositions of this invention can be made having a wide range of physical properties, such as cone penetration, ultimate elongation, and tear strength, desirable for particular end use applications. In general, compositions having a cone penetration from about 50 to about 300 ($10^{-1}$ mm) (ASTM D217-82) and an ultimate elongation of at least 200% (ASTM D412) are particularly useful as sealing materials.

The styrene-diene block copolymers useful in the radiation cross-linked compositions of this invention include the SEBS triblock copolymers discussed above, poly(styrene-butadiene-styrene) block copolymers (SBS), poly(styrene-isoprene-styrene) block copolymers (SIS) and similar styrene-diene block copolymers known in the art. The SBS block copolymers are preferred in some applications and in other applications the SEBS triblock copolymers are preferred.

The oils useful in the radiation cross-linked styrene-diene block copolymer-oil composition of this invention can be the same oils as defined above.

The coupling agents or prorads useful in the electron beam radiation cross-linking of the block copolymer-oil composition include the conventional multifunctional coupling agents, such as trimethyl propane trimethacrylate (TMPTM) and the triacrylate (TMPTA), 1,6-hexanedimethacrylate (HDODM) and the diacrylate (HDODA) as well as other coupling agents or prorads useful for electron beam radiation cross-linking of unsaturated rubbers. The TMPTM is preferred for use with SEBS triblock copolymer-oil compositions. Photo initiators for use with UV radiation cross-linking likewise include the conventional photo initiators used for UV radiation cross-linking of unsaturated polymers such as 2,2'-diethoxyacetophenone, benzophenone, acetophenone anthraquione, benzaldehyde, triphenzlamine, benzoinethers, benzil, and the like.

The amount of coupling agent or prorad present in the composition to be radiation cross-linked will vary from about 0.5 to about 25% by weight based on the combined weight of the copolymer and oil. In general, it will be preferred to use about 1 to about 15% coupling agent. When UV radiation is used the photoinitiator should also be added in an amount from about 0.05% to about 5% by weight of the total composition. In general an effective amount will range from about 0.1% to about 1.0% photoinitiator.

The electron beam radiation dosage will depend on the composition, its configuration and the degree of cross-linking desired. In general, the radiation does well range from about 1 megarad to about 30 megarads and preferably will be in the range of about 2 to about 25. The amount of UV radiation will likewise depend on the degree of cross-linking desired and other relevant factors.

It will be useful to use various additives for various purposes in both the triblock copolymer-oil compositions and the styrene-diene block copolymer-oil radiation cross-linked compositions of this invention. Such additives may be stabilizers, antioxidants, flame retardants, tackifiers and the like. It is useful to use antioxidants in all the compositions of this invention and in particular it is useful to use the antioxidants in the compositions of this invention which are radiation cross-linked.

The compositions of this invention have numerous uses as elastomeric materials and in particular may be used as sealing materials as illustrated in copending applications Ser. No. 434,011, filed Oct. 12, 1982 and Ser. No. 698,643, filed Feb. 6, 1985. These copending applications are referred as merely exemplary uses of the compositions of this invention which will obviously have many and varied uses depending on the properties desired in the particular device or material in which these compositions are used. The radiation cross-linked compositions of this invention find particular usefulness in applications where higher tempertures are encountered. Certain of the additives can be used to enable these compositions stable at even higher temperatures.

EXAMPLE 1

The following compositions were prepared from SEBS triblock copolymers which were (a) Shell Kraton G1650 having a styrene to ethylene-butylene ratio of 28:72 and (b) Shell Kraton G1651 having a styrene to ethylene/butylene ratio of 33:67. The oil used was a non-aromatic paraffinic/naphthenic oil available from Witco under the trademark "Kaydol". An antioxidant was employed which is a hindered phenol available from Ciba-Geigy under the trademark "Irganox 1010". In each case the ingredients were melt blended then poured into molds having a diameter of about three inches and a depth of about ¾ inch to form test samples of the elastomeric material which were about ½ inch thick. For each sample the cone pentration (ASTM D217-82), the tensile strength (ASTM D412), and the ultimate elongation (ASTM D412) were determined and are shown below.

| Sample # | Parts by Weight | Component | Cone Penetration (mm $10^{-1}$) | Tensile Strength (psi) | Elongation (%) |
|---|---|---|---|---|---|
| 1 | 0 | G1651 | 59 | 47 | 700 |
|   | 20 | G1650 |   |   |   |
|   | 79 | Kaydol |   |   |   |
|   | 1 | Irganox 1010 |   |   |   |
| 2 | 5 | G1651 | 66 | 95 | 980 |
|   | 15 | G1650 |   |   |   |
|   | 79 | Kaydol |   |   |   |
|   | 1 | Irganox 1010 |   |   |   |
| 3 | 10 | G1651 | 118 | 108 | 1430 |
|   | 10 | G1650 |   |   |   |

-continued

| Sample # | Parts by Weight | Component | Cone Penetration (mm 10$^{-1}$) | Tensile Strength (psi) | Elongation (%) |
|---|---|---|---|---|---|
| 4 | 79<br>1<br>15<br>5 | Kaydol<br>Irganox 1010<br>G1651<br>G1650 | 124 | 123 | 1760 |
| 5 | 79<br>1<br>20<br>0 | Kaydol<br>Irganox 1010<br>G1651<br>G1650 | 161 | 142 | 1810 |
| 6 | 79<br>1<br>10<br>0 | Kaydol<br>Irganox 1010<br>G1651<br>G1650 | 199 | 63 | 1730 |
| 7 | 89<br>1<br>5<br>0 | Kaydol<br>Irganox 1010<br>G1651<br>G1650 | 275 | 16 | 1300 |
|  | 94<br>1 | Kaydol<br>Irganox 1010 |  |  |  |

EXAMPLE 2

In this example the composition from sample number 3 of Example 1 was prepared but also included the indicated percentages of prorad TMPTM based on the total weight of the composition. Each prepared composition was then subjected to the indicated electron beam radiation dose then subjected to tests to determine the gel content, compressive modulus (Voland-Stevens LFRA Texture Analyzer) and slump resistance at 100° C. and 150° C. The results for each sample is shown below.

| Sample | PRORAD LEVEL (%) | BEAM DOSE | GEL CONTENT (%)[1] | COMPRESSIVE MODULUS (PSI) | SLUMP RESISTANCE 100° C.[2] | SLUMP RESISTANCE 150° C.[3] |
|---|---|---|---|---|---|---|
| 1 | 0 | 0 MRADS | 0 | 26.0 | Deformed | Flowed |
| 2 | 0 | 6 MRADS | 0 | 17.5 | Deformed | Flowed |
| 3 | 0 | 12 MRADS | 0 | 9.9 | Deformed | Flowed |
| 4 | 0 | 24 MRADS | 0 | 3.4 | Deformed | Flowed |
| 5 | 2 | 0 MRADS | 0 | 27.2 | Deformed | Flowed |
| 6 | 2 | 6 MRADS | 4.0 | 28.0 | No slump | No slump |
| 7 | 2 | 12 MRADS | 6.8 | 17.7 | No slump | No slump |
| 8 | 2 | 24 MRADS | 8.7 | — | No slump | No slump |
| 9 | 5 | 0 MRADS | 0 | 35.0 | Flowed | Flowed |
| 10 | 5 | 6 MRADS | 23.7 | 45.6 | No slump | No slump |
| 11 | 5 | 12 MRADS | 17.9 | 33.2 | No slump | No slump |
| 12 | 5 | 24 MRADS | 14.9 | 19.7 | No slump | No slump |
| 13 | 10 | 0 MRADS | 0 | 43.3 | Flowed | Flowed |
| 14 | 10 | 6 MRADS | 29.5 | 70.0 | No slump | No slump |
| 15 | 10 | 12 MRADS | 29.7 | 50.0 | No slump | No slump |
| 16 | 10 | 24 MRADS | 27.5 | 36.0 | No slump | No slump |

[1] 72 hours in boiling toluene.
[2] 16 hours
[3] 16 hours

What is claimed is:

1. A crosslinked composition comprising:
about 2 to about 30 parts by weight of a styrene-diene block copolymer;
about 70 to about 98 parts by weight hydrocarbon oil; and
about 0.5 to about 25% by weight based on the weight of the copolymer and oil of a multifunctional coupling agent; and
wherein the copolymer-oil-coupling agent composition is cross-linked with electron beam radiation or with UV radiation in the presence of a photoinitiator.

2. A composition according to claim 1, wherein the styrene-diene block copolymer comprises a SEBS, SBS, or SIS copolymer.

3. A composition according to claim 2, wherein the styrene-diene block copolymer comprises SEBS or SBS copolymer.

4. A composition according to claim 1, wherein the composition is cross-linked with electron beam radiation with a beam dose of about 1 to about 30 megarads.

5. A composition according to claim 3, wherein the composition is cross-linked with electron beam radiation with a beam dose of about 1 to about 30 megarads.

6. A composition according to claim 1, wherein the coupling agent is TMPTM.

7. A composition according to claim 5, wherein the coupling agent is TMPTM.

8. A composition according to claim 1, wherein the copolymer is a blend of a SEBS triblock copolymer having a styrene to ethylene-butylene ratio of 28:72 and a SEBS triblock copolymer having a styrene to ethylene-butylene ratio of 33:67.

9. A composition according to claim 6, wherein the copolymer is a blend of a SEBS triblock copolymer having a styrene to ethylene-butylene ratio of 28:72 and a SEBS triblock copolymer having a styrene to ethylene-butylene ratio of 33:67.

10. A method of preparing a radiation cross-linked elastomeric composition comprising:
mixing about 2 to about 30 parts by weight of a styrene-diene block copolymer, about 70 to about 98 parts by weight hydrocarbon oil and about 0.5 to about 25% by weight of a multifunctional coupling agent based on the combined weight of the copolymer and oil under shear and elevated temperature which are sufficient to cause the block copolymer to melt and disperse in the hydrocarbon oil; and
cross-linking the resultant composition with electron beam radiation or with UV radiation in the presence of a photoinitiator.

* * * * *